US006970636B2

(12) United States Patent
Stegmaier et al.

(10) Patent No.: US 6,970,636 B2
(45) Date of Patent: Nov. 29, 2005

(54) DEVICE FOR CONNECTING A FIRST OPTICAL COMPONENT TO A SECOND OPTICAL COMPONENT

(75) Inventors: Klaus-Dieter Stegmaier, Viechtach (DE); Thomas Dörmer, Kolbermoor (DE)

(73) Assignees: Arnold & Richter Cine Technik GmbH & Co., Munich (DE); Betriebs KG, Munich (DE)

( * ) Notice: Subject to any disclaimer, the term of this patent is extended or adjusted under 35 U.S.C. 154(b) by 0 days.

(21) Appl. No.: 10/475,486

(22) PCT Filed: Apr. 16, 2002

(86) PCT No.: PCT/DE02/01462

§ 371 (c)(1),
(2), (4) Date: Apr. 23, 2004

(87) PCT Pub. No.: WO02/086384

PCT Pub. Date: Oct. 31, 2002

(65) Prior Publication Data

US 2004/0170372 A1 Sep. 2, 2004

(30) Foreign Application Priority Data

Apr. 20, 2001 (DE) ........................................ 101 20 740

(51) Int. Cl.$^{7}$ .................................................. G02B 6/00
(52) U.S. Cl. ........................................................ 385/147
(58) Field of Search ................................. 439/312–318, 439/616

(56) References Cited

U.S. PATENT DOCUMENTS 4,697,894 A 10/1987 Takamura et al.
5,367,408 A 11/1994 Corsan et al.
5,483,384 A 1/1996 Takizawa et al.
5,758,958 A 6/1998 Chen
6,368,135 B1 * 4/2002 Ho ............................. 439/321

FOREIGN PATENT DOCUMENTS

| | | | |
|---|---|---|---|
| DE | 33 02 003 | A1 | 7/1984 |
| DE | 35 41 855 | C2 | 6/1986 |
| DE | 41 27 128 | A1 | 2/1993 |
| DE | 693 01 838 | T2 | 7/1993 |
| FR | 2 733 300 | | 10/1996 |
| WO | WO 86/02986 | | 5/1986 |

OTHER PUBLICATIONS

English Translation of International Preliminary Examination Report of PCT/DE02/01462, dated Aug. 11, 2003.
International Search Report of PCT/DE02/01462, dated Oct. 17, 2002.
International Preliminary Examination Report of PCT/DE02/01462, dated Aug. 11, 2003.

* cited by examiner

*Primary Examiner*—Khiem Nguyen
(74) *Attorney, Agent, or Firm*—Christie, Parker & Hale, LLP

(57) ABSTRACT

A device for connecting a first optical component to a second optical component, particularly for connecting the lamp housing of a spotlight to a lamp adapter. The device includes a connecting ring which has a first region which rotatably secures the connecting ring to the first optical component, and a second region which is axially distanced from the first region and enables the connecting ring to be connected to the second optical component. The second region includes coupling means, which engage with corresponding coupling means of the second optical component by rotating the connecting ring. The invention enables two optical components to be connected in a fast, simple manner.

21 Claims, 5 Drawing Sheets

Fig. 2
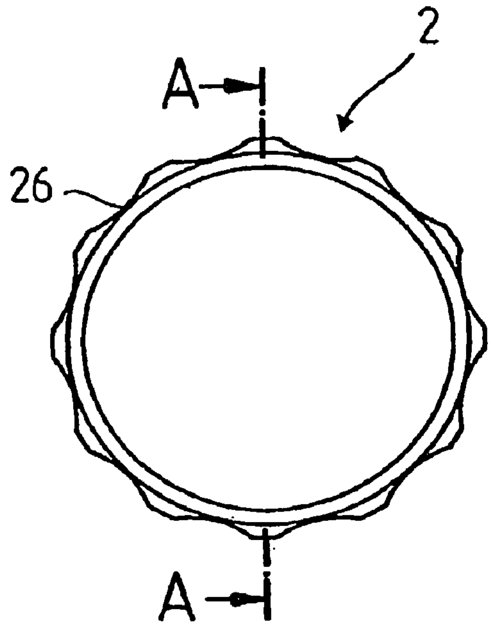
Fig. 3
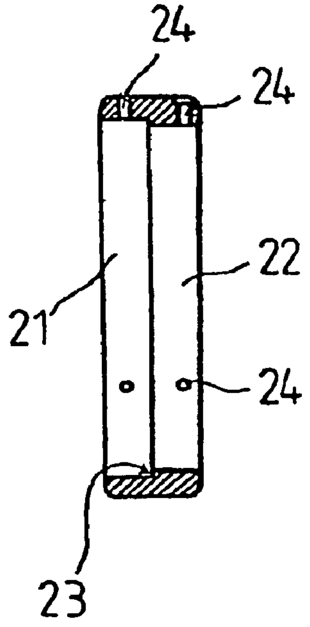
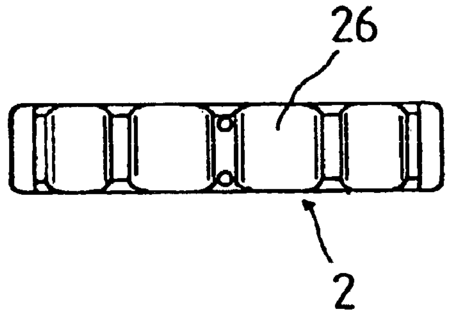
Fig. 4

DEVICE FOR CONNECTING A FIRST OPTICAL COMPONENT TO A SECOND OPTICAL COMPONENT

CROSS-REFERENCE TO RELATED APPLICATION

This application is a National Phase Patent Application of International Application Number PCT/DE02/01462, filed on Apr. 16, 2002, which claims priority of German Patent Application Number 101 20 740.9, filed on Apr. 20, 2001.

FIELD

The invention relates to a device for connecting a first optical component to a second optical component, more particularly to connect a lamp housing of a spotlight to a lamp adapter, as well as to electrical components with or for use with a device of this kind.

BACKGROUND

Spotlights for film, studio or stage lighting have a lamp housing which contains a holder for receiving a bulb, or a burner, an igniter for the lamp and the burner as well as a reflector. The lamp housing is, dependent on the current demands, fitted with different lamp adapters which contain different lens sets and light guiding systems. The connection between the lamp adapter and lamp housing should thereby be made quickly and easily in order to ensure a simple reliable handling of the spotlight.

DE A1 41 27 128 describes a light fitting having holders which enable different adapter elements to be mounted on the light fitting. It is proposed to mount the holders rotatable whereby sockets for the holders mounted in several planes have substantially the same spacing from the rotational axis of the holder. The same object can thereby be held selectively in different planes by simply turning the holder.

BRIEF DESCRIPTION

An object of the present invention is to provide a device for connecting a first optical component, more particularly a lamp housing, to a second optical component, more particularly an adapter, which enables such connection in simple, easily handled manner. In addition, optical components are to be prepared with or for use with a device of this kind.

The device according to the invention is characterised by a connecting ring which has a first region with which the connecting ring can be fixed rotatable on the first optical component. The first region is adjoined axially at a distance by a second region with which the connecting ring can be connected to the second component. The second region thereby has coupling means which during rotation of the connecting ring move into engagement with associated coupling means of the second component. By turning the connecting ring relative to the first component the second component can be connected to the first component in a simple, rapid manner.

In a preferred embodiment of the invention it is proposed that the coupling means of the second region of the connecting ring form at least one coupling part which protrudes from the surface of the connecting ring and by turning the connecting ring engages, for example, with a bayonet type groove of the second component. The coupling part can thereby preferably be a roller movable about its axis whereby the axis runs perpendicular to the surface of the connecting ring.

The movable rollers ensure a uniform easy turning rotation and connection of the connecting ring and optical component.

It is preferred if in the second region of the connecting ring there are three rollers arranged symmetrically on the inside, each engaging in an associated bayonet type groove of the second component when the connecting ring is turned. The arrangement of three uniformly distributed rollers is advantageous to prevent the connection from tilting and to guarantee a central connection.

In a preferred embodiment of the invention the first region of the connecting ring engages in a circumferential groove of the first component through at least two connecting parts which protrude from inside of the connecting ring. The connecting ring and the first component are thereby connected together permanently but rotatable. The connecting parts can preferably be rollers, more particularly three rollers arranged symmetrically on the inside of the first region of the connecting ring to engage in the circumferential groove. The rollers also ensure here a uniform smooth easy running rotation and connection.

Between the first and second region of the connecting ring there is preferably a ledge or inner web which separates the two regions of the connecting ring from each other. More particularly, the ledge or connecting ring forms a stop for one coupling region of the second component which engages in the connecting ring.

The outside of the connecting ring is preferably provided with grip indents or other user friendly surface configurations which make it easier to handle and turn the connecting ring. The grip indents can thereby be provided with a heat-insulating material so that they are easier to handle.

In a further aspect of the invention, an optical component, more particularly a lamp housing of a spotlight, is provided which has a connecting ring according to the invention. The first region of the connecting ring is thereby connected to the optical component rotatable yet secured against loss. Then by simply turning the connecting ring a second optical component can be coupled to the rotatably connected unit of optical component and connecting ring.

To support the connecting ring on the optical component the optical component has a cylindrical coupling region with a circumferential groove in which connecting parts of the first region of the connecting ring engage. The circumferential groove is thereby preferably an external groove whereby the connecting ring surrounds the coupling region of the component on the outside. In this way the connecting elements are mounted in a protected position on the inside or in the inner region of the connecting ring.

In a preferred embodiment of the invention, two resilient contact pins are provided on the optical component and are coupled to a safety switch which ensures the optical component switches off if the contact pins are not in electrical contact with dedicated contacts of a contact plate of a second optical component. The optical component, more particularly the lamp mounted in the lamp housing, is hereby automatically switched off when the lamp housing is separated from the lamp adapter, which prevents UV-rays emitted by the lamp from being radiated out at random.

In a further aspect of the invention, an optical component is provided which has a cylindrical coupling area for connecting with the one connecting ring according to the invention. The component part thereby has in its coupling region coupling means for connecting with the coupling means of the second region of the connecting ring according to the invention. For this at least one bayonet type groove is provided in which corresponding coupling parts of the connecting ring engage when the connecting ring is turned.

The optical component has in its coupling region preferably additional detent means in which the coupling means of the connecting ring can engage. These detent means are for example indents formed at the end of the bayonet-type grooves in which movable rollers of the connecting ring can engage with an audible and touch setting.

The optical component preferably has in addition a resilient element, for example an O-ring, which is placed between the optical component and a further optical component. Through the compression force which is produced by the resilient element the coupling means of the connecting ring are guaranteed to engage in the detent means.

A contact plate having two contact paths connected together through a contact bridge is preferably additionally integrated in the optical component. The contact plate serves to make contact with the two contact pins of a further component.

BRIEF DESCRIPTION OF THE DRAWING

The invention will now be explained in further detail with reference to the embodiment illustrated in the drawings. They show:

FIG. 2 is a front view of a connecting ring according to the invention;

FIG. 3 is a section view through the connecting ring of FIG. 2 along the line A—A;

FIG. 4 is a plan view of the connecting ring of FIG. 2;

DETAILED DESCRIPTION

Figure 1:
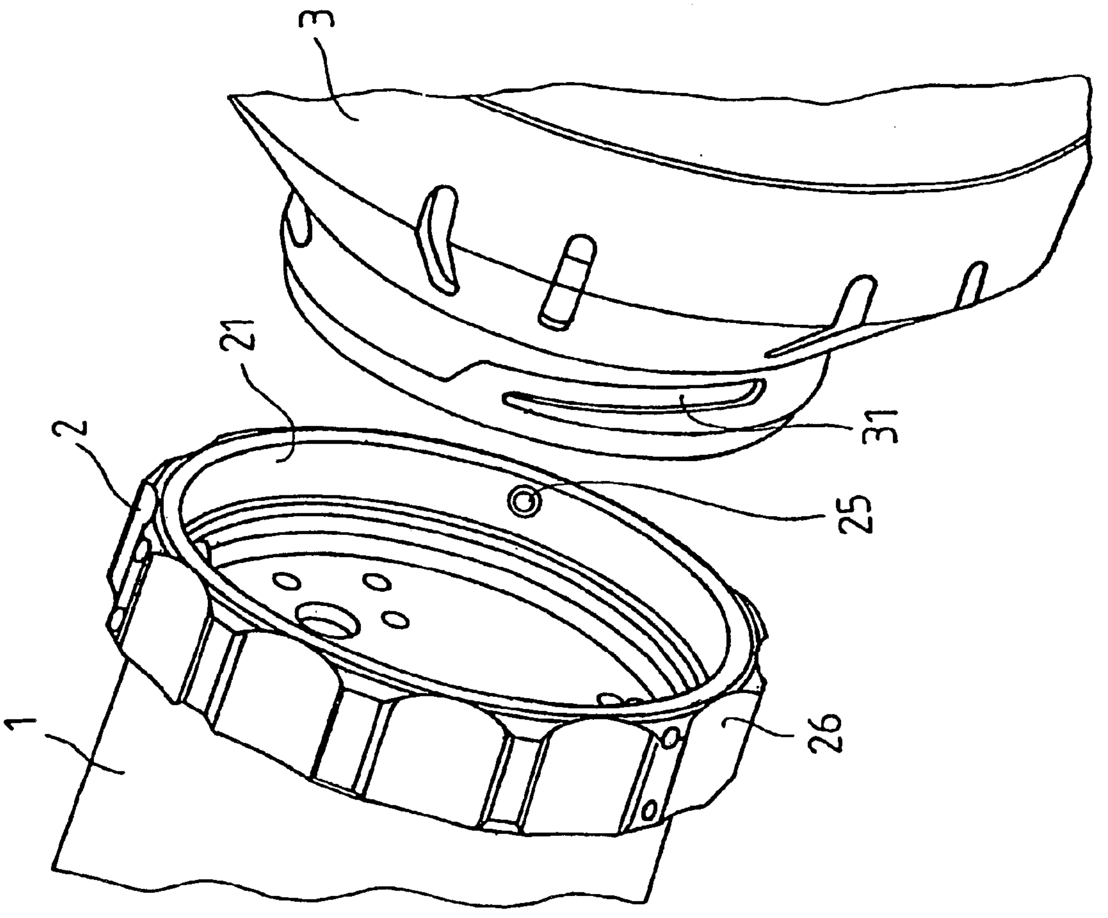
FIG. 1 is a perspective view of a connecting device according to the invention for connecting a lamp housing to a lamp adapter.

FIG. 1 shows a lamp housing 1 which can be connected to a lamp adapter 3 by means of a connecting ring 2. The lamp housing 1 is part of a spotlight for film, studio, stage lighting or further useful areas and has in known way in particular an ignition device, a lamp holder, a lamp or a burner and a reflector. Of the lamp housing 1 shown in FIG. 1, only a cylindrical section is shown to which the lamp adapter 3 is to be coupled. Different lamp adapters 3 can thereby be provided which each have different light guiding systems.

As explained below, a simple rapid connection is produced between the lamp housing 1 and a desired lamp adapter 3 through the connecting ring 2.

According to FIGS. 2 to 4, the connecting ring 2 has a first region 22 through which the connecting ring 2 can be connected rotatable to the housing 1, and a second region 21 through which the connecting ring can be connected to the lamp holder 3. The two regions 21, 22 of the connecting ring are axially spaced. They have a slightly different diameter whereby an inner circumferential stop edge 23 is provided at the boundary area between the two regions against which the corresponding coupling part of the lamp holder 3 comes into contact.

As an alternative, it can also be proposed that the first and second region 21, 22, respectively, have the same diameter and a circumferential web (not shown) is arranged on the inside of the connecting ring 2 to separate the two regions.

On the inside of the connecting ring 2, namely both in the one region 21 and in the other region 22, there are three uniformly spaced out rollers 25 which are mounted rotatable about an axis running perpendicular to the surface of the connecting ring 2. Corresponding bearing openings 24 for these rollers are shown in the sectional view of FIG. 3.

Figure 7:
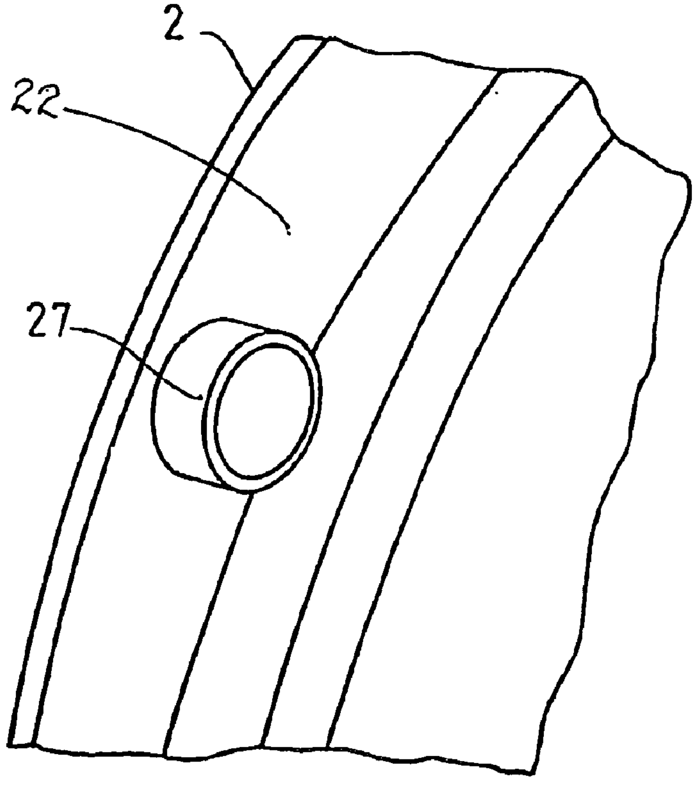
FIG. 7 is an enlarged view of a rotatable roller mounted on the inside of a connecting ring according to the invention and serving as the connecting part.

The rollers which are mounted in the one region 22 serve to connect the connecting ring 2 to the lamp housing 1 and the rollers mounted in the other region 21 of the connecting ring serve to connect with the lamp adapter 3. FIG. 1 shows a corresponding connecting roller 25 in the one region 21 of the connecting ring. A corresponding roller 27 is shown in FIG. 7 in the region 22 of the connecting ring.

According to FIGS. 2 and 4 a number of grip indents 26 are formed on the outer circumference of the connecting ring to enable safe handling of the connecting ring 2 and make it easier to turn the connecting ring 2. The grip indents can thereby be provided with a heat-insulating plastics (not shown).

Figure 5:
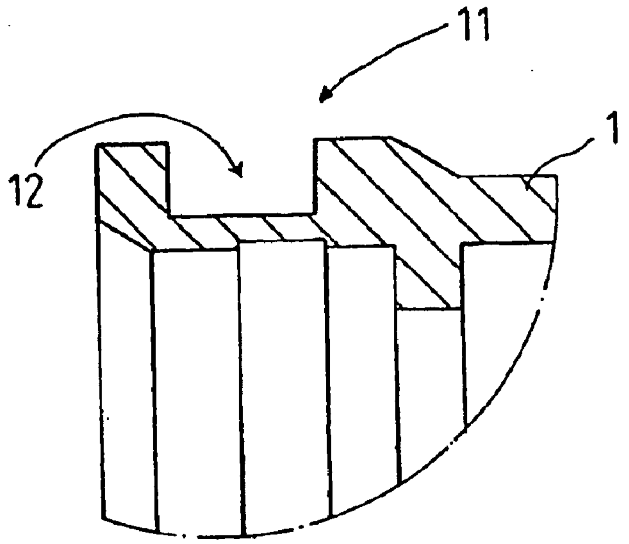
FIG. 5 is an enlarged view of the coupling region of the lamp housing of FIG. 1.

The connection between the connecting ring 2 and the lamp housing 1 is shown in FIG. 5. The lamp housing forms on its ends facing the lamp adapter which is to be coupled a cylindrical coupling region or ledge 11 which forms a circumferential groove 12. The outer diameter of the ledge 11 thereby corresponds substantially to the inner diameter of the connecting ring 2. Three rollers 27 (see FIG. 7) which are spread out evenly in the region 22 of the connecting ring associated with the lamp housing 1 thereby run in the circumferential groove 12. This produces a rotatable secured connection between the connecting ring 2 and lamp housing 1.

As a result of the movable roller 25 the connecting ring 2 can rotate evenly, smoothly and easily opposite the lamp housing 1.

Figure 6A:
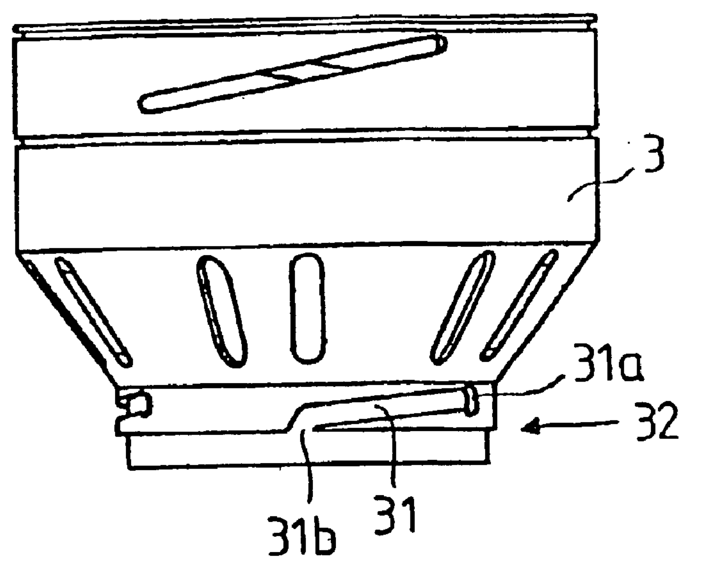
FIG. 6*a* is a first plan view of a lamp adapter with a coupling region according to the invention.
Figure 6B:
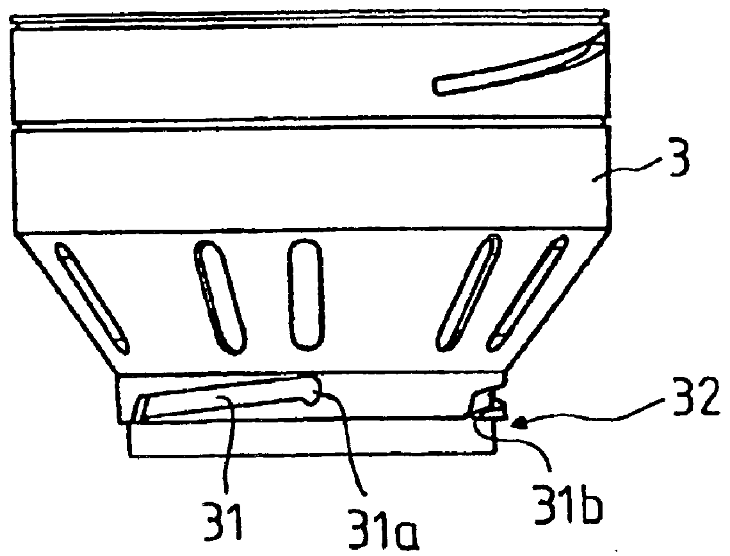
FIG. 6*b* is a second plan view of the lamp adapter of FIG. 6*a;*

According to FIGS. 6*a*, 6*b* the connection between the connecting ring 2 and the lamp adapter 3 which is to be coupled thereto is made by the rollers 25 which are mounted in the region 21 of the connecting ring 2 engaging in bayonet type grooves 31 of the lamp adapter 3.

The lamp adapter 3 thereby has as coupling region a cylindrical region or ledge 32 in which overall three bayonet-type grooves 31 are formed. The grooves 31 are spread out uniformly on the ledge 32 and correspond in position to the rollers 25 of the connecting ring 2. They have a coupling opening 31*b* which faces the connecting ring 2 and then run with a slight rise inclined to the longitudinal axis of the lamp adapter 3.

To connect the lamp adapter 3 to the lamp housing 1 it is only necessary to insert the ledge 32 of the lamp adapter 3 into the connecting ring 2. On subsequently turning the connecting ring 2 the movable rollers then automatically move into the bayonet type grooves 31 and are guided up to the end stop of the grooves 31. As a result of the incline of the grooves 31, when the rollers 25 of the connecting ring 2 move along the grooves 31 the lamp adapter 3 is automatically moved in the direction of the connecting ring 2 and then by its ledge 32 into same so that a fixed sealed connection is produced.

Thus by simply turning the connecting ring 2 which is connected to the lamp housing 1 the lamp adapter is automatically connected to the connecting ring 2 and to the lamp housing 1.

In order to ensure that the rollers 25 engage in the end stop of the grooves and cannot come loose the ends of the grooves are formed according to FIGS. 6*a* and 6*b* with indents 31*a* into which the movable rollers 25 engage. In order to ensure secure engagement of the rollers 25 in the indents 31*a* a resilient element such as for example an O-ring (not shown) is provided between the lamp adapter and the lamp housing to produce a certain compression force between the lamp housing and lamp adapter.

Figure 8:
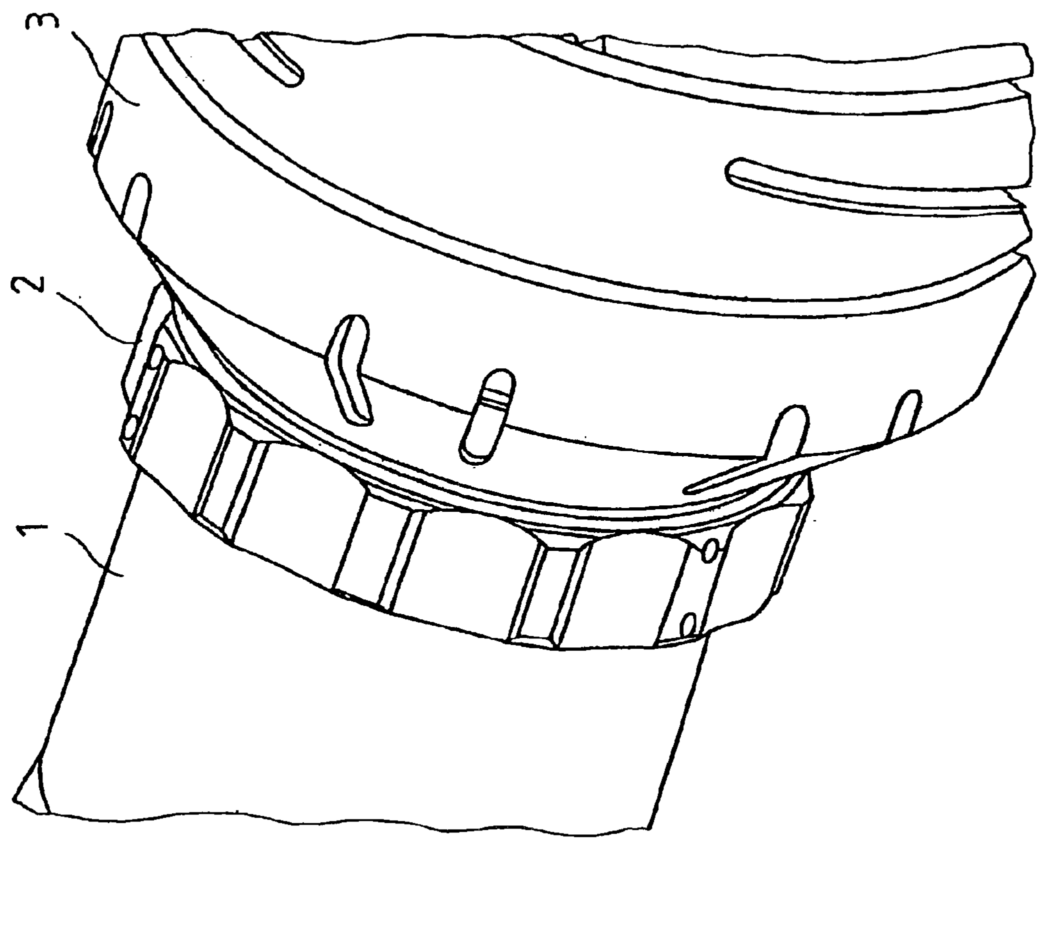
FIG. 8 shows a connecting device according to the invention according to FIG. 1 after connecting the lamp adapter to the lamp housing.

FIG. 8 shows the connecting assembly according to the invention after the lamp adapter has been connected to the lamp housing 1 by means of the connecting ring according to the invention. Where necessary, a different lamp adapter can be easily attached to the housing by rotating the connecting ring, removing the lamp adapter, inserting a new lamp adapter in the connecting ring and then turning the connecting ring again.

It should be pointed out that in the lamp housing 1 there are two resilient contact pins which are connected to a safety switch (not shown). When connecting the lamp housing to the lamp adapter according to FIG. 8 the resilient contact pins move into contact with a contact plate which is mounted on the lamp adapter and has two circular contact paths which are connected together through a contact bridge. As soon as the lamp adapter is removed from the lamp housing and the resilient contact pins are disconnected from the contact plate the safety switch ensures the lamp is automatically switched off to prevent undesired radiation of the UV-rays. A safety arrangement of this kind is known from DE U 200 16 303.5.

The invention is not restricted in its design to the embodiments illustrated above. By way of example other coupling parts such as e.g. pins can be used in place of the rollers. These can be fitted in an alternative design also on the end side of the connecting ring instead of on the inside of the connecting ring. Furthermore slits can be used as coupling means in place of the bayonet type grooves in the lamp adapter. It is solely essential for the invention that a connecting ring having a first and second region is provided whereby it can be connected through the first region to a first optical component and through the second region to a second optical component and wherein in the second region coupling means are provided which automatically engage with the associated coupling means of the second component when the connecting ring is turned.

What is claimed is:

1. A device for connecting a first optical component to a second optical component, comprising a connecting ring which has a first region through which the connecting ring can be fixed rotatable on the first optical component, and a second region axially spaced from the first region through which the connecting ring can be connected to the second optical component, whereby the second region has coupling means which engage with an associated coupling means of the second optical component when the connecting ring is turned and, wherein the first and second regions of the connecting ring are separated from each other by one of a ledge and an inner web.

2. The device according to claim 1, wherein the coupling means of the second region of the connecting ring has at least one coupling part which protrudes from a surface of the connecting ring and which on turning the connecting ring engages with a bayonet type groove of the second optical component.

3. The device according to claim 2, wherein the coupling part is at least one of mounted and formed on an inside of the second region of the connecting ring.

4. The device according to claim 2 or 3, wherein the coupling part is a roller movable about an axis whereby the axis of the roller runs perpendicular to the surface of the connecting ring.

5. The device according to claim 4, wherein three rollers are arranged symmetrically on the inside of the second region of the connecting ring and each engage in an associated bayonet type groove of the second component when the connecting ring is turned.

6. The device according to claim 1, wherein the first region of the connecting ring has at least two connecting parts which protrude from an inside of the connecting ring and engage in a circumferential groove of the first component.

7. The device according to claim 6, wherein each connecting part is a roller which is movable about an axis whereby the axis of the roller runs perpendicular to the surface of the connecting ring.

8. The device according to claim 7, wherein the first region of the connecting ring has three symmetrically arranged rollers.

9. The device according to claim 1, wherein the outside of the connecting ring has grip indents.

10. The device according to claim 9, wherein the connecting ring is provided with a heat-insulating material in the region of the grip indents.

11. An optical component comprising the connecting ring according to claim 1 whereby the first region of the connecting ring is mounted rotatable and secured on the first optical component.

12. The optical component according to claim 11, wherein the first optical component has a cylindrical coupling member with a circumferential groove in which connecting parts of the first region of the connecting ring engage.

13. The optical component according to claim 12, wherein the circumferential groove is an external groove and the first region of the connecting ring surrounds the coupling member of the component on the outside.

14. An optical component for connecting to a lamp housing of a spotlight, comprising a cylindrical coupling region with coupling means through which the optical component is connectable to a connecting ring according to claim 1.

15. The optical component according to claim 14, wherein the cylindrical coupling region has at least one bayonet type groove.

16. The optical component according to claim 15, wherein the bayonet type groove is an external groove and the second region of the connecting ring surrounds the coupling region of the component from the outside.

17. The optical component according to at least one of claims 14 to 16, wherein the cylindrical coupling region has detent means for engaging the coupling means of the connecting ring.

18. The optical component according to claim 15, wherein the detent means are indents formed at an end of the bayonet type grooves.

19. The device according to claim 1 wherein the first optical component comprises a lamp housing and the second optical component comprises a lamp adapter.

20. The optical component according to claim 11 wherein the optical component comprising a lamp housing of a spotlight.

21. The optical component according to claim 14, wherein the optical component is a lamp adapter.

* * * * *